United States Patent
Glück et al.

(10) Patent No.: US 11,958,468 B2
(45) Date of Patent: Apr. 16, 2024

(54) METHOD FOR OPERATING A MOTOR VEHICLE AND THE CORRESPONDING MOTOR VEHICLE

(71) Applicant: AUDI AG, Ingolstadt (DE)

(72) Inventors: Christian Glück, Ingolstadt (DE); Markus Fischer, Neuburg (DE)

(73) Assignee: AUDI AG, Ingolstadt (DE)

( * ) Notice: Subject to any disclaimer, the term of this patent is extended or adjusted under 35 U.S.C. 154(b) by 86 days.

(21) Appl. No.: 17/516,447

(22) Filed: Nov. 1, 2021

(65) Prior Publication Data

US 2022/0135017 A1 May 5, 2022

(30) Foreign Application Priority Data

Nov. 2, 2020 (DE) .......................... 102020128730.5

(51) Int. Cl.
*B60W 20/10* (2016.01)

(52) U.S. Cl.
CPC ....... *B60W 20/10* (2013.01); *B60W 2510/244* (2013.01); *B60W 2530/10* (2013.01)

(58) Field of Classification Search
CPC ...... B60W 20/10; B60W 20/13; B60W 20/19; B60W 20/20; B60W 20/40; B60W 2510/244; B60W 2530/10; B60W 2050/0095; B60W 2520/10; B60W 2520/105; B60W 2530/16; B60W 2540/10; B60W 2552/15
See application file for complete search history.

(56) References Cited

U.S. PATENT DOCUMENTS

| | | | |
|---|---|---|---|
| 8,571,736 B2 | 10/2013 | Falkenstein et al. | |
| 11,021,151 B2* | 6/2021 | Valero | B60W 30/18018 |
| 2001/0039230 A1* | 11/2001 | Severinsky | B60W 20/30 180/65.23 |
| 2004/0040758 A1* | 3/2004 | Shimizu | B60W 10/06 903/902 |
| 2012/0209464 A1* | 8/2012 | Falkenstein | B60W 40/1005 903/902 |

(Continued)

FOREIGN PATENT DOCUMENTS

| | | |
|---|---|---|
| CN | 102686434 A | 9/2012 |
| DE | 10 2008 001 159 A1 | 10/2009 |

(Continued)

*Primary Examiner* — George C Jin
(74) *Attorney, Agent, or Firm* — Seed IP Law Group LLP

(57) ABSTRACT

A method for operating a motor vehicle including a drive mechanism having at least a first drive unit and at least a second drive unit is provided. The method includes providing a drive torque directed at the driving of the motor vehicle in a first setting of the drive mechanism only by means of the second drive unit and in a second setting by means of both drive units, wherein upon exceeding a start-up threshold value by a demanded preset power there is a switching from the first setting to the second setting, and upon falling below a shut-off threshold value by the demanded preset power there is a switching from the second setting to the first setting. It is provided that the start-up threshold value and/or the shut-off threshold value is determined in dependence on a driving resistance of the motor vehicle and/or a vehicle weight of the motor vehicle. A motor vehicle employing the method is also provided.

9 Claims, 1 Drawing Sheet

(56) References Cited

U.S. PATENT DOCUMENTS

| | | | | |
|---|---|---|---|---|
| 2015/0105213 A1* | 4/2015 | Wright | ................ | B60W 20/40 |
| | | | | 180/65.265 |
| 2016/0129803 A1* | 5/2016 | Grewal | ................ | B60W 50/14 |
| | | | | 701/123 |
| 2016/0375892 A1* | 12/2016 | Kim | ................ | B60W 10/08 |
| | | | | 701/22 |
| 2018/0072322 A1* | 3/2018 | Ishiguro | .............. | B60W 30/143 |
| 2018/0201250 A1* | 7/2018 | D'Amato | .............. | B60W 10/06 |
| 2021/0347369 A1* | 11/2021 | Owen | .............. | B60W 50/0097 |

FOREIGN PATENT DOCUMENTS

| | | |
|---|---|---|
| DE | 10 2009 045 567 A1 | 4/2011 |
| DE | 10 2015 106 028 A1 | 10/2015 |
| DE | 10 2017 218 855 A1 | 4/2019 |
| JP | 2010-044755 A | 2/2010 |
| KR | 10-2012 0055136 A | 5/2012 |
| WO | 2011/089251 A1 | 7/2011 |

\* cited by examiner

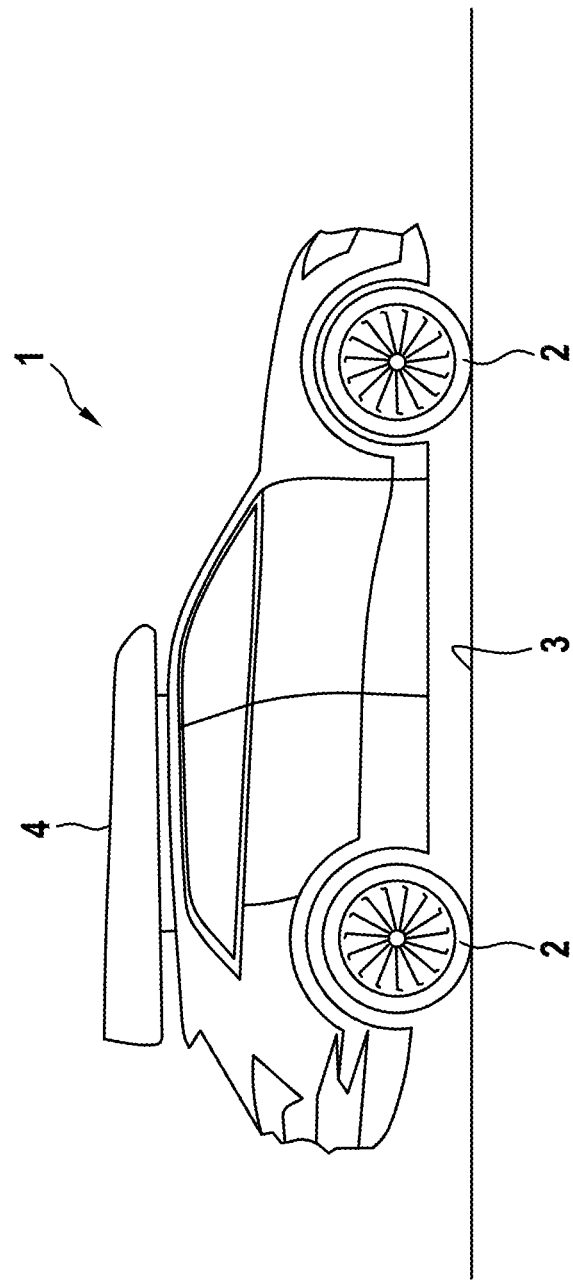

METHOD FOR OPERATING A MOTOR VEHICLE AND THE CORRESPONDING MOTOR VEHICLE

BACKGROUND

Technical Field

Embodiments of the invention relate to a method for operating a motor vehicle, comprising a drive mechanism having at least a first drive unit and at least a second drive unit, wherein a drive torque directed at the driving of the motor vehicle is provided in a first setting of the drive mechanism only by means of the second drive unit and in a second setting by means of both drive units, wherein upon exceeding a start-up threshold value by a demanded preset power there is a switching from the first setting to the second setting, and upon falling below a shut-off threshold value by the demanded preset power there is a switching from the second setting to the first setting. Embodiments of the invention further relate to a motor vehicle.

Description of the Related Art

From the prior art there is known, for example, the document DE 10 2015 106 028 A1. This describes a control system in a vehicle having an internal combustion engine, a first motor-generator and a second motor-generator. The control system starts the engine when a required vehicle output is greater than or equal to a predetermined starting threshold value and stops the engine when the required vehicle output is less than or equal to a predetermined stopping threshold value. The control system controls the engine such that an output power greater than or equal to a predetermined output lower limit is produced, during a phase starting from the time when the required vehicle output is greater than or equal to the predetermined starting threshold value and until the time when the required vehicle output is less than or equal to the predetermined stopping threshold value. The predetermined output lower limit is set at the predetermined starting threshold value which is used when the required vehicle output becomes greater than or equal to the predetermined starting threshold value.

Furthermore, there is known from the document DE 10 2017 218 855 A1 a method for operating a hybrid vehicle having an electric motor, which is provided and adapted to produce a mechanical propulsion power for the hybrid vehicle and, upon braking, to convert a kinetic energy of the hybrid vehicle into a recuperated electrical energy, an electrical generator, which is adapted to producing an electrical energy, a startable combustion engine, which is provided and adapted to produce and/or provide a mechanical propulsion power for the hybrid vehicle and the electrical generator upon a corresponding rise in the load point, and multiple electrical consumers forming an on-board electrical network, wherein the combustion engine is started during a driving of the hybrid vehicle if a required propulsion power for a current driving speed exceeds a start-up power determined for the current driving speed.

BRIEF SUMMARY

Some embodiments provide a method for the operation of a motor vehicle that has benefits over the known methods, especially one making possible a greater efficiency and thereby reducing fuel consumption.

It may be provided that the start-up threshold value and/or the shut-off threshold value is determined in dependence on a driving resistance of the motor vehicle and/or a driving weight of the motor vehicle.

The method serves for operating the motor vehicle. The motor vehicle comprises the drive mechanism, which is provided and adapted to driving the motor vehicle. Accordingly, the drive mechanism serves for providing a drive torque directed at driving the motor vehicle. For this purpose, the drive mechanism comprises the first drive unit and the second drive unit, which can be coupled together for the drive engineering. This means that different settings can be made on the drive mechanism, and in the first setting the drive torque used for driving the motor vehicle is provided solely with the aid of the second drive unit. For example, the first drive unit is switched off in the first setting, while the second drive unit is operated to generate the drive torque. The switched-off first drive unit for example has zero rpm when the first setting is present.

During the providing of the drive torque solely by means of the first drive unit, the drive torque may have basically any given direction, i.e., it may be directed at an accelerating or decelerating of the motor vehicle. In the case of accelerating, the second drive unit is operated with electrical energy, which is taken from the traction battery. If the drive torque is directed at decelerating the motor vehicle, the traction machine will be operated as a generator to create the drive torque and the electrical energy produced in this way will be stored temporarily in the traction battery. This process is known as recuperation.

On the other hand, if the second setting is present, then both drive units will be operated to provide the drive torque, i.e., both the first drive unit and the second drive unit. Accordingly, each of the drive units provides a portion of the drive torque, so that this is added up from a first partial torque of the first drive unit and a second partial torque of the second drive unit. The two partial torques may be in the same direction, so that the drive torque will be greater than each of the two partial torques. Accordingly, there is a so-called boost operation of the drive mechanism, in which both drive units are called upon to accelerate the motor vehicle.

However, it may also be provided, of course, that the partial torques are directed opposite each other. Such a procedure may be used if the first drive unit is a combustion engine and the second drive unit is an electrical traction machine. The electrical traction machine will be operated as a generator and it will be driven by the combustion engine. Thus, the combustion engine not only provides the drive torque directed at driving the motor vehicle, but also additionally drives the electrical traction machine in order to provide electrical energy by means of it, which is stored temporarily in a traction battery, for example. Such a load point shift operation ensures an operating of the combustion engine with greater efficiency.

The momentary setting of the drive mechanism is selected at least from the first setting and the second setting and it is set at the drive mechanism. The selection is done in dependence on the preset power which is demanded at the moment. By the preset power is meant that power which is set at the drive mechanism. The preset power may be specified by the driver of the motor vehicle and/or by a driver assist mechanism of the motor vehicle. In particular, the preset power depends on a position of an operator element of the motor vehicle, such as a gas pedal.

If the preset power exceeds the start-up threshold value, and thus the preset power is greater than the start-up threshold value, a switching occurs from the first setting to the second setting, unless the latter is already present. This means that, as of a certain preset power, corresponding to the start-up threshold value, the drive torque will no longer be provided solely by means of the first drive unit, but rather by means of both drive units. If the first drive unit not yet used has been switched off, it will be activated or switched on and be coupled in the drive engineering with the second drive unit.

Upon switching from the first setting to the second setting it may be provided that the torque of the drive unit used thus far will be maintained. In some embodiments, however, it will be adjusted. For example, it is provided to start or tow-start the first drive unit by means of the second drive unit. This means that the partial torque generated by the second drive unit first needs to be increased in order to continue to provide the drive torque, and at the same time tow-start the first drive unit. After the starting of the first drive unit, it may be provided to decrease the torque of the second drive unit so that the overwhelming portion of the drive unit is then generated by means of the first drive unit. The second drive unit may be operated either to provide a torque in the same direction as the first partial torque or an opposite partial torque—depending on an operating point of the drive mechanism.

If, however, the demanded preset power drops below the shut-off threshold value, i.e., it is less than this, there will be a switching from the second setting to the first setting, unless this is already present. This means that the drive torque will then be provided solely by means of the second drive unit, while the first drive unit may be switched off or at least is not coupled with the second drive unit in the drive engineering.

In other words, the start-up threshold value describes the power of the drive mechanism as of which the first drive unit is supposed to provide the drive torque together with the second drive unit. The shut-off threshold value, on the contrary, is that power of the drive mechanism below which the drive torque should be generated solely by means of the second drive unit. For example, it is provided to decouple the first drive unit from the second drive unit in the drive engineering in the first setting of the drive mechanism, for example by opening a coupling provided between the first drive unit and the second drive unit.

In the second setting, on the other hand, the first drive unit is coupled in drive engineering with the second drive unit, for example by closing the coupling. Accordingly, the two drive units in the second setting may be coupled together firmly against rotation. In any case, in the second setting both the first drive unit and the second drive unit are operated. If the first drive unit is designed as a combustion engine, then in the first setting the supply of fuel to the combustion engine may be interrupted or switched off, while in the second setting fuel is supplied to the combustion engine.

In order to improve the efficiency of the drive mechanism and hence that of the motor vehicle, the start-up threshold value, the shut-off threshold value, or both, should not be chosen in fixed manner or depend only on a state variable of the drive mechanism, but rather they should be determined in dependence on a state variable of the motor vehicle. One of the following variables will be used as the state variable: the driving resistance of the motor vehicle and the vehicle weight of the motor vehicle. Thus, it can be provided to determine the start-up threshold value and/or the shut-off threshold value from the driving resistance, but not from the vehicle weight, from the vehicle weight, but not the driving resistance, or from both the driving resistance and the vehicle weight.

This results in the following possible combinations: determining the start-up threshold value from the driving resistance; determining the start-up threshold value from the vehicle weight; determining the start-up threshold value from the driving resistance and the vehicle weight; determining the shut-off threshold value from the driving resistance; determining the shut-off threshold value from the vehicle weight; determining the shut-off threshold value from the driving resistance and the vehicle weight; determining the start-up threshold value and the shut-off threshold value from the driving resistance; determining the start-up threshold value and the shut-off threshold value from the vehicle weight; and determining the start-up threshold value and the shut-off threshold value from the driving resistance and the vehicle weight.

By the driving resistance is meant a state variable of the motor vehicle describing at least a resistance which the motor vehicle must overcome with the aid of the drive torque in order to travel with a constant or accelerating speed on a horizontal or inclined path. The resistance comprises, for example, an air drag, a rolling resistance, a gradient resistance and/or an acceleration resistance. The air drag can also be called the flow resistance of the motor vehicle. It describes the resistance which the air surrounding the motor vehicle exerts on the motor vehicle. The rolling resistance basically described the resistance caused by a deformation of the tires of the motor vehicle. The gradient resistance results from the downward force acting on the motor vehicle as it travels on an inclined path. On the other hand, the acceleration resistance acts counter to the changing of the speed of the motor vehicle.

Taking into account the driving resistance and/or the vehicle weight when determining the start-up threshold value and/or the shut-off threshold value allows for a flexible adjustment of the drive mechanism to the momentary state of the motor vehicle. In this way, an extremely efficient operation of the drive mechanism and hence of the motor vehicle is assured.

One embodiment includes that the first drive unit is a combustion engine and the second drive unit is an electrical traction machine. Accordingly, the two drive units have different designs, so that the drive mechanism is a hybrid drive mechanism. Such a configuration of the drive mechanism allows for an especially high efficiency throughout a broad operating range.

One embodiment includes that the electrical traction machine is electrically connected to a traction battery and the start-up threshold value and/or the shut-off threshold value is determined in dependence on a charge state of the traction battery. Electrical energy for the operation of the electrical traction machine is removed at least some of the time from the traction battery for the at least partial providing of the drive torque. On the other hand, electrical energy is supplied at least some of the time to the traction battery, having been provided from the electrical traction machine, especially during the recuperation mode.

It is self-explanatory that the drive mechanism can only be operated at the first setting if the charge state of the traction battery allows this. In order to provide a drive torque directed at the accelerating of the motor vehicle with the aid of the second drive unit, electrical energy is required, and this should be taken from the traction battery. On the other hand, it is necessary for the charge state of the traction battery to allow a temporary storage of electrical energy in the traction battery, if the motor vehicle is to be slowed down or braked while using the second drive unit.

For this reason, the start-up threshold value, the shut-off threshold value, or both the start-up threshold value and the shut-off threshold value should be determined in dependence on the charge state of the traction battery. For example, the start-up threshold value will be chosen lower as the charge state is lower. In addition or alternatively, it may be provided that the shut-off threshold value will be lower as the charge state is lower. Such a procedure ensures that enough electrical energy is always on hand in the traction battery to be used for operating the second drive unit.

One embodiment includes that the electrical traction machine is operated at least some of the time as a generator for charging the traction battery, the start-up threshold value and/or the shut-off threshold value being determined in dependence on a charge power of the charging process. The generator mode of the electrical traction machine can be used for example to slow down the motor vehicle or during a driving of the second drive unit by means of the first drive unit. The electrical energy accruing in this process is used to charge the traction battery, the charging being done with the charging power.

It has already been described above that the charge state must allow a charging of the traction battery during the driving of the second drive unit in generator mode. Accordingly, the start-up threshold value and/or the shut-off threshold value may be determined in dependence on the charging power. In some embodiments, both the charge state and the charging power may be taken into account when determining the start-up threshold value and/or the shut-off threshold value. This assures a high efficiency over broad operating ranges of the drive mechanism.

One embodiment includes that the start-up threshold value and/or the shut-off threshold value is determined in dependence on a parameter formed from the driving resistance and the vehicle weight. Thus, the particular value is not determined directly from the driving resistance and the vehicle weight, but instead from the parameter. The start-up threshold value and/or the shut-off threshold value are accordingly dependent only indirectly on the driving resistance and the vehicle weight. Instead, in a first step, the parameter is calculated from the driving resistance and the vehicle weight, for example taking account of weighting factors. For example, the driving resistance enters more strongly into the parameter than the vehicle weight, or vice versa. Finally, the start-up threshold value, the shut-off threshold value, or both are calculated from the parameter. This procedure has benefits in terms of the required computing capacity.

One embodiment includes that the driving resistance is the air drag of the motor vehicle. By the air drag is meant the flow resistance which is exerted on the motor vehicle by the air surrounding the motor vehicle. The air drag is especially dependent on the driving speed of the motor vehicle, in particular, as a quadratic or at least approximately quadratic function. For example, the air drag is thus calculated with the aid of the driving speed of the motor vehicle. But other methods of determination may also be used. Taking into account the driving resistance enables an extremely precise adjustment of the start-up threshold value and/or the shut-off threshold value to the momentary driving situation of the motor vehicle.

One embodiment includes that the driving resistance is determined with the aid of a state variable of at least one motor vehicle attachment. The motor vehicle attachment is a component which can be fastened to the outside of the motor vehicle, in particular, one which is joined only temporarily to the motor vehicle. The motor vehicle attachment may be, for example, a luggage rack, a roof box, or the like. If the motor vehicle attachment is present on a motor vehicle, the driving resistance is substantially higher than without the motor vehicle attachment. Accordingly, it is advisable to take into account the presence of the motor vehicle attachment when determining the start-up threshold value and/or the shut-off threshold value.

The state variable of the motor vehicle attachment may describe the presence of the motor vehicle attachment, i.e., whether or not the motor vehicle attachment is present on the motor vehicle. However, it may also be provided to memorize a value for different motor vehicle attachments, from which the driving resistance will be calculated as soon as the motor vehicle attachment is arranged on the motor vehicle. For example, this value will be automatically determined once the motor vehicle attachment is connected to the motor vehicle. However, it may also be provided that the driver will manually enter the value or at least the type of motor vehicle attachment. In the latter case, the value for determining the driving resistance will be determined from the type of motor vehicle attachment. The described procedure, once again, enables a precise adapting of the start-up threshold value and/or the shut-off threshold value to the momentary driving situation of the motor vehicle.

One embodiment includes that the driving resistance and/or the motor vehicle weight is determined with the aid of an operating variable of the drive mechanism and a state variable of the motor vehicle. In this way, it is possible to determine the particular value very precisely from the momentary driving situation of the motor vehicle. The operating variable of the drive mechanism is, for example, the power provided by the drive mechanism or the drive torque delivered by it. The state variable is, for example, the momentary driving speed of the motor vehicle and/or an acceleration or deceleration of the motor vehicle.

The driving resistance may be determined from the power of the drive mechanism needed to maintain constant driving speed. Thus, the driving speed is used as a state variable of the motor vehicle. In addition or alternatively, the acceleration of the motor vehicle will be used as a state variable. With the aid of the acceleration and the drive torque, the driving resistance and/or the vehicle weight are determined for the motor vehicle. In addition, of course, the momentary driving speed may be factored into this determination. Accordingly, there is an automatic learning of the driving resistance and/or the motor vehicle weight from different variables.

Alternatively, of course, it is possible to derive the driving resistance solely from the driving speed. Likewise, it can be provided to measure the motor vehicle weight, for example, to determine this from a measured spring deflection travel of the motor vehicle chassis. In this way as well it is possible to achieve sufficiently accurate findings for the driving resistance or the vehicle weight.

One embodiment includes that the start-up threshold value and/or the shut-off threshold value is chosen to be smaller as the vehicle weight is lower and/or as the driving resistance is greater. Thus, with decreasing vehicle weight, the start-up threshold value or the shut-off threshold value will also become smaller. The greater the motor vehicle weight, the more electrical energy will accrue during the recuperation making use of the second drive unit. Accordingly, less support is required by means of the first drive unit. On the other hand, a larger driving resistance makes necessary a stronger supporting of the second drive unit by means of the first drive unit. Accordingly, the start-up threshold value and the shut-off threshold value should become smaller with larger driving resistance.

Basically, it may be provided to shift the start-up threshold value and the shut-off threshold value in parallel with each other, i.e., so that the difference between them is constant over time, regardless of their respective value. The start-up threshold value is basically larger than the shut-off threshold value, in order to accomplish a hysteresis in the switching on of the first drive unit. Of course, however, it may also be provided to determine the start-up threshold value and the shut-off threshold value independently of each other from the driving resistance and/or the vehicle weight, making use of different factors. In this case, the difference between the start-up threshold value and the shut-off threshold value will change in dependence on the driving resistance and/or the vehicle weight. In this way, an even more precise adapting of these values to the momentary driving state of the motor vehicle can be accomplished.

Some embodiments relate to a motor vehicle, especially a vehicle for implementing the method according to the remarks in the context of this specification, wherein the motor vehicle comprises a drive mechanism having at least a first drive unit and at least a second drive unit, wherein a drive torque directed at the driving of the motor vehicle is provided in a first setting of the drive mechanism only by means of the second drive unit and in a second setting by means of both drive units, wherein the motor vehicle is provided and adapted so that, upon exceeding a start-up threshold value by a demanded preset power there is a switching from the first setting to the second setting, and upon falling below a shut-off threshold value by the demanded preset power there is a switching from the second setting to the first setting. Furthermore, the motor vehicle is provided and adapted to determine the start-up threshold value and/or the shut-off threshold value in dependence on a driving resistance of the motor vehicle and/or a vehicle weight of the motor vehicle.

The benefits of such a procedure and the benefits of such a configuration of the motor vehicle have already been pointed out. Both the motor vehicle and the method for its operation can be modified according to the remarks in the context of this specification.

The features and combinations of features described in the specification, especially the features and combinations of features described in the following description of the figures and/or indicated in the figures, can be used not only in the particular indicated combination, but also in other combinations or standing alone, without leaving the scope of the invention. Thus, embodiments not explicitly shown or explained in the specification and/or the figures, yet emerging or deriving from the mentioned forms of expression, are to be viewed as being also encompassed by the invention.

BRIEF DESCRIPTION OF THE SEVERAL VIEWS OF THE DRAWINGS

Embodiments of the invention shall be explained more closely below with the aid of embodiments represented in the drawing, without this being a limitation of the invention.

FIG. 1 shows a schematic representation of a motor vehicle with a motor vehicle attachment.

DETAILED DESCRIPTION

FIG. 1 shows a schematic representation of a motor vehicle 1, which is supported by multiple wheels 2 on a roadway 3. The wheels 2 can be driven by means of a drive mechanism of the motor vehicle 1, the drive mechanism comprising at least a first drive unit and at least a second drive unit. The first drive unit is present in the form of a combustion engine, whereas the second drive unit is designed as an electrical traction machine. In a first setting of the drive mechanism, a drive torque acting on the wheels 2 is provided solely by means of the second drive unit. At a second setting of the drive mechanism, on the other hand, the first drive unit and the second drive unit work together to provide the drive torque.

If a preset power demanded of the drive mechanism is greater than a start-up threshold value, the second setting will be used. But if the preset power is less than or equal to the shut-off threshold value, the first setting will be set. The start-up threshold value and the shut-off threshold value are variable in time and depend on a driving resistance of the motor vehicle and a vehicle weight of the motor vehicle 1. The driving resistance is in particular dependent on the presence of a motor vehicle attachment 4 on the motor vehicle 1, being configured in the embodiment shown here as a roof box.

It is self-evident that the driving resistance of the motor vehicle with the motor vehicle attachment 4 is substantially greater than that without the motor vehicle attachment 4. For example, it is determined whether the motor vehicle attachment 4 is present on the motor vehicle 1 and accordingly adapted to the driving resistance. The driving resistance results in particular from a driving speed of the motor vehicle 1 on the one hand and the presence of the motor vehicle attachment 4 on the other hand.

The described procedure for the operating of the motor vehicle 1 makes possible an especially good adapting of the behavior of the drive mechanism to a momentary driving situation of the motor vehicle 1. In this way, a greater efficiency of the drive mechanism and hence of the overall motor vehicle 1 is achieved.

German patent application no. 10 2020 128730.5, filed Nov. 2, 2020, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a motor vehicle including a drive mechanism having a first drive unit and a second drive unit, comprising:
providing, in a first setting of the drive mechanism, by only the second drive unit, a first drive torque for driving the motor vehicle;
providing, in a second setting of the drive mechanism, by both the first drive unit and the second drive unit, a second drive torque for driving the motor vehicle;
upon exceeding a start-up threshold value by a demanded preset power, switching from the first setting to the second setting; and
upon falling below a shut-off threshold value by the demanded preset power, switching from the second setting to the first setting,
wherein the start-up threshold value and/or the shut-off threshold value is determined in dependence on a driving resistance of the motor vehicle and a vehicle weight of the motor vehicle, wherein the driving resistance is determined with the aid of a state variable of at least one motor vehicle attachment, the state variable of the at least one motor vehicle attachment relating to the presence of the at least one motor vehicle attachment on the vehicle, and wherein the driving resistance is increased when the at least one motor vehicle attachment is attached to the motor vehicle.

2. The method according to claim 1, wherein the first drive unit is a combustion engine and the second drive unit is an electrical traction machine.

3. The method according to claim 2, wherein the electrical traction machine is electrically connected to a traction battery and the start-up threshold value and/or the shut-off threshold value is determined in dependence on a charge state of the traction battery.

4. The method according to claim 2, wherein the electrical traction machine is operated at least some of the time as a generator for charging the traction battery, the start-up threshold value and/or the shut-off threshold value being determined in dependence on a charge power of the charging process.

5. The method according to claim 1, wherein the start-up threshold value and/or the shut-off threshold value is determined in dependence on a parameter formed from the driving resistance and the vehicle weight.

6. The method according to claim 1, wherein the driving resistance is the air drag of the motor vehicle.

7. The method according to claim 1, wherein the driving resistance and/or the motor vehicle weight is determined with the aid of an operating variable of the drive mechanism and a state variable of the motor vehicle.

8. The method according to claim 1, wherein the start-up threshold value and/or the shut-off threshold value is chosen to be smaller as the vehicle weight is lower and as the driving resistance is greater.

9. A motor vehicle comprising:
a drive mechanism having a first drive unit and a second drive unit;
wherein, in a first setting of the drive mechanism, a first drive torque for driving the motor vehicle is provided only by the second drive unit;
wherein, in a second setting of the drive mechanism, a second drive torque for driving the motor vehicle is provided by both drive units;
wherein the motor vehicle is configured so that, upon exceeding a start-up threshold value by a demanded preset power, there is a switching from the first setting to the second setting, and upon falling below a shut-off threshold value by the demanded preset power there is a switching from the second setting to the first setting; and
wherein the motor vehicle is further configured to determine the start-up threshold value and/or the shut-off threshold value in dependence on a driving resistance of the motor vehicle and a vehicle weight of the motor vehicle,
wherein the driving resistance is determined with the aid of a state variable of at least one motor vehicle attachment, the state variable of the at least one motor vehicle attachment relating to the presence of the at least one motor vehicle attachment on the vehicle, and
wherein the driving resistance is increased when the at least one motor vehicle attachment is attached to the motor vehicle.

* * * * *